June 24, 1930.                W. A. CHRYST                1,766,881
                  UNIVERSAL JOINT FOR SHOCK ABSORBERS
                         Filed July 18, 1928

Inventor
William A. Chryst
By Spencer Hardman & Fehr
His Attorneys

Patented June 24, 1930

1,766,881

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

UNIVERSAL JOINT FOR SHOCK ABSORBERS

Application filed July 18, 1928. Serial No. 293,759.

This invention relates to a non-metallic pivot joint interconnecting two rigid metal members.

An object of the invention is to provide a simple and efficient form of pivot shackle having a resilient non-metallic bushing therein which provides for all relative movement between the connected parts by internal distortion within the non-metallic material, whereby wear, rattle, and necessity of lubrication is avoided.

A more specific object is to provide an improved form of non-metallic pivot joint which is suitable for pivotally connecting an automobile hydraulic shock absorber lever arm to its thrust link, or for pivotally connecting the lower end of said thrust link with the axle fitting.

Further objects and advantages of the present invention will be apparent from the following description, reference being had to the accompanying drawings, wherein a preferred embodiment of one form of the present invention is clearly shown.

In the drawings.

Similar reference characters refer to similar parts throughout the several drawings.

Figure 1:
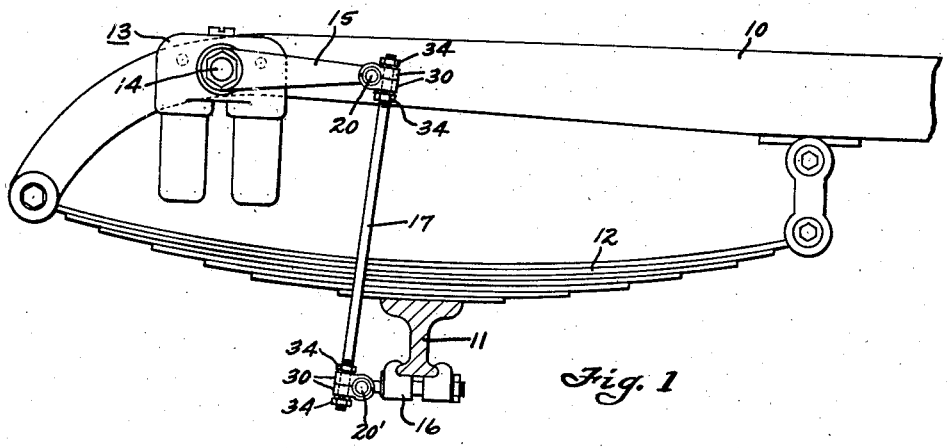
Fig. 1 is a somewhat diagrammatic view showing parts of the front end of an automobile chassis equipped with a hydraulic shock absorber, and also showing the thrust link connected to the shock absorber lever arm by the pivot joint of this invention.

Referring to Fig. 1, 10 designates the front end of the chassis side rail, 11 the front axle, 12 the semi-elliptic leaf spring connecting the frame and axle in an ordinary manner, and 13 a double cylinder hydraulic shock absorber unit which is rigidly fixed to frame 10. Unit 13 has a projecting lever arm 15 which swings about shaft 14 as an axis when axle 11 moves up and down due to the road wheels passing over uneven places in the road. The outer end of lever arm 15 is connected to a fitting 16 fixed to axle 11 by means of the rigid thrust link 17. Link 17 is pivotally connected to the outer end of arm 15 and, at its lower end, to the fitting 16, and causes lever 15 to swing up or down, as the case may be, against the resistance of the hydraulic pistons within unit 13. Therefore link 17 is under compression when axle 11 is moving up, and under tension when axle 11 is moving down. The parts so far described form no part of the present invention and hence are not disclosed herein in greater detail, this invention relating to the improved form of pivot joint connecting link 17 to arm 15 and fitting 16 respectively.

Figure 3:
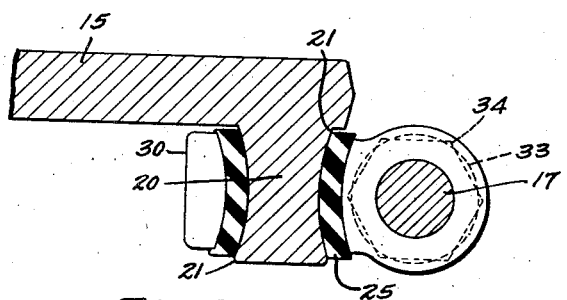
Fig. 3 is a section on line 3—3 of Fig. 2.

The outer end of lever arm 15 has a laterally projecting journal 20, preferably shaped as clearly shown in Fig. 3, that is, the diameter of journal 20 is a minimum at the central portion and gradually increases toward the end portions 21 of the journal.

Figure 2:
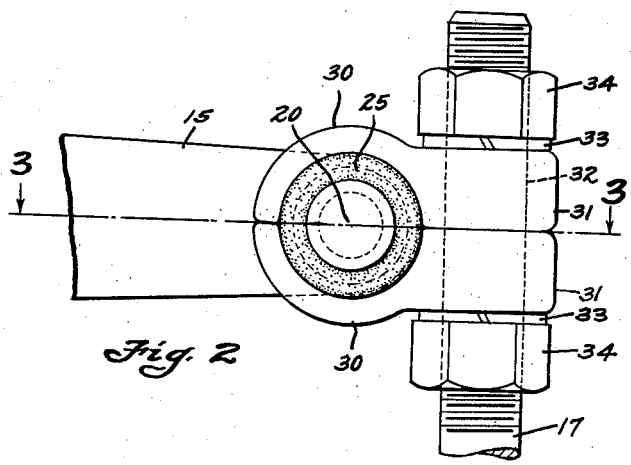
Fig. 2 is a side elevation on a greatly enlarged scale of the pivot joint of this invention.

A one-piece elastic rubber bushing 25 is telescoped endwise upon journal 20. Preferably bushing 25 has a normal internal diameter less than that of the end portion 21 of journal 20, hence requiring that the bushing 25 be stretched while it is being telescoped over journal 20 and causing it to be retained in place more securely with no tendency to work endwise off journal 20. Two separate metal clamps 30 together form an exterior metal sleeve for bushing 25 when placed in position as shown in Figs. 1 and 2. Each of the clamps 30 has a projecting ear 31 apertured at 32 to permit the end of link 17 to pass through said apertures. Nuts 34 are threaded to link 17 both above and below the ears 31. When nuts 34 are set up very tight upon the ears 31 with the lock-washers 33 therebetween, the clamps 30 will be firmly clamped down upon the soft rubber bushing 25, putting it under the desired initial compression and causing it to bulge outwardly at the unconfined ends thereof as shown in Fig. 3. This compression will cause the rubber to grip the surface of its confining metal walls and resist relative slipping between the rubber bushing and either journal 20 or the exterior divided sleeve formed by clamps 30. Hence pivotal movement of journal 20 within the exterior sleeve 30 will be taken altogether by an internal twisting distortion within the soft rubber bushing 25. Hence there will be no wear nor rattling between metal parts at the pivot joint.

Preferably the inside diameter of the exterior divided sleeve 30, 30 conforms to that of the journal 20, that is, it is a minimum at the center of length of journal 20 and widens out toward each end thereof. This outline of journal 20 and its exterior sleeve 30, 30 provides for a substantially uniform compression of the soft rubber bushing throughout its length and holds the exterior sleeve 30, 30 properly centered upon journal 20 in a manner which is obvious from viewing Fig. 3. The rubber bushing 25 will yield sufficiently to accommodate a small sidesway movement between axle 11 and chassis frame member 10, that is, the pivot joint between link 17 and arm 15 will yield laterally to a limited extent without clamps 30, 30 contacting with the arm 15.

In Fig. 1, link 17 is shown connected at its lower end to the journal 20′ on the fitting 16 fixed to axle 11 by the same kind of pivot joint as hereinabove described for its connection to arm 15. Journal 20′ is rigid with fitting 16 and may be similar in all respects to journal 20.

While the form of embodiment of the present invention as herein disclosed, constitutes a preferred form, it is to be understood that other forms might be adopted, all coming within the scope of the claims which follow.

What is claimed is as follows:

1. In combination, a lever arm, a rigid link connected to said arm by a pivot joint capable of transmitting thrust between said link and arm, said joint comprising: a pivot journal rigid with and projecting laterally from said arm, a resilient non-metallic bushing telescoped upon said journal, two half-sleeve metal clamps clamped upon the exterior of said bushing and radially compressing the resilient material thereof, said clamps having aligned projecting ears each having a hole extending therethrough, said link extending through the hole in said ears and having means thereon for rigidly clamping said clamps together.

2. In combination, a lever arm, a rigid link connected to said arm by a pivot joint capable of transmitting thrust between said link and arm, said joint comprising: a laterally projecting pivot journal rigid with said arm, a resilient non-metallic bushing telescoped upon said journal, two half-sleeve metal clamps clamped upon the exterior of said bushing and compressing the resilient material thereof, said clamps having aligned projecting ears each having a hole extending therethrough, said link extending through the hole in said ears, and having a nut threaded thereto on each side of said ears for rigidly fixing said clamps together.

3. A non-metallic isolating pivot joint between a lever and a connecting link, said joint comprising: a pivot journal rigid with said lever and having its end portions of greater diameter than its central portion, an elastic rubber bushing telescoped endwise upon said journal and snugly fitting same, a divided exterior sleeve having its separate halves clamped radially upon said rubber bushing and compressing the same throughout its length to cause the elastic rubber to grip the surface of its confining metal walls, the separate halves of said divided sleeve being held clamped together by and rigidly fixed to said link.

4. A non-metallic isolating pivot joint between a lever and a connecting link, said joint comprising: a pivot journal rigid with said lever and having its end portions of greater diameter than its central portion, an elastic rubber bushing telescoped endwise upon said journal and snugly fitting same, a divided exterior sleeve having its separate halves clamped radially upon said rubber bushing and compressing the same throughout its length to cause the elastic rubber to grip the surface of its confining metal walls, the separate halves of said divided sleeve having aligned apertured ears thereon through which said link extends, and nuts threaded to said link on each side of said ears and clamping said sleeve halves together.

In testimony whereof I hereto affix my signature.

WILLIAM A. CHRYST.